United States Patent Office 3,035,896
Patented May 22, 1962

3,035,896
COMPOUNDS OF THE FORMULA $AB'_{0.5}B''_{0.5}O_3$ AND PROCESS FOR PREPARING THE SAME
Lothar H. Brixner, West Chester, Pa., assignor to E. I. du Pont de Nemours and Company, Wilmington, Del., a corporation of Delaware
No Drawing. Filed Aug. 3, 1959, Ser. No. 831,032
7 Claims. (Cl. 23—51)

This invention relates to new and useful compounds possessing a perovskite structure.

Perovskite is a mineral having the chemical formula $CaTiO_3$ (calcium titanate). It is a crystalline material having a characteristic structure, and other crystalline materials having a similar type structure are often referred to as perovskite-type compounds. Crystals of the perovskite structure are represented by the general formula $ABO_3$ in which A is a divalent positive ion, and B is a tetravalent positive ion. The simplest perovskite crystal structure is a cube having one $ABO_3$ formula per unit cell. In this structure, the A ions are at the corners of the unit cell, the B ion at the cell center, and the negative ions occupy the face-centered positions. Many investigators have studied crystals exhibiting the perovskite structure, and numerous perovskites with substitutions in the A and B sites have been reported. One of the earliest workers in this field was V. M. Goldschmidt who in 1926 reported (Skrifter Norske Videnskaps-Akad. Mat. Naturvid Kl. No. 2) the theoretical requirements and relationship for crystals of the perovskite structure. More recently, a comprehensive paper has been written by R. S. Roth (Journal of Research of the National Bureau of Standards, vol. 58, No. 2, February 1957, Research Paper 2736). In his work, Roth discusses the $A^{+2}B^{+4}O_3$ crystal structure of the perovskite-type crystal, as well as the $A^{+3}B^{+3}O_3$ type structure. J. S. Waugh has reported (MIT Progress Report No. XXIII, p. 54 (1958)) perovskites with substitutions in the A-sites, such as $$La_{0.5}Ba_{0.5}MnO_3$$

Those with substitutions in the B-sites such as $$LaZr_{0.5}Mg_{0.5}O_3$$

have been reported by A. Rabenau (Z. anorg. Allgem. Chem. 288, 221–34 (1956)).

The perovskite-type compounds of the present invention have the formula $$AB'_{0.5}B''_{0.5}O_3$$

wherein A is a divalent alkaline earth metal ion selected from the group consisting of barium and strontium; B' is niobium; and B'' is a trivalent metal ion selected from the group consisting of chromium, indium, gallium, lanthanum, and praseodymium.

The compounds of this invention are prepared by firing a three-component, powdered mixture of (1) an alkaline earth metal compound selected from the group consisting of barium oxide, barium carbonate, strontium oxide, and strontium carbonate, (2) niobium pentoxide, and (3) a metal oxide selected from the group consisting of chromium sesquioxide, indium sesquioxide, gallium sesquioxide, lanthaum sesquioxide, and praseodymium sesquioxide. The proportions of the components in such a mixture are 4 mols of the alkaline earth metal compound, 1 mol of niobium pentoxide, and 1 mol of the metal sesquioxide. These amounts are the stoichiometric proportions for the reaction shown in the equation given below. It is preferred to use materials of the best available purity, and in instances where a transition metal oxide is being used in less than its maximum valence state, it is preferred to use an alkaline earth metal oxide rather than a carbonate. Firing temperatures usually range from 1000° C. to 1400° C. The firing may be accomplished in one operation, or the powdered mixture may be fired, reground, pressed into pellets, and refired at a higher temperature. Such procedures are well known in the art. In a preferred procedure, the powdered mixture of reactants is prepared by grinding the reactants under acetone in a ball mill. After separation from the acetone, the mixture is fired in vacuo at a temperature of from about 1000° C. to about 1200° C. for a period of from ½ to 2 hours. After regrinding and pressing, the resultant pellets are refired at a temperature of about 1300° C.–1400° C. for about 1 to 2 hours in vacuo. The product obtained is an $A^{+2}B^{+4}O_3$ with substitution in the B sites. These materials are useful as dielectric materials for capacitors and as ceramic materials. They are especially useful as a ceramic for electrical equipment.

As a result of the firing, chemical reaction takes place according to Equation I when an alkaline earth metal carbonate is used, and according to Equation II when an alkaline earth metal oxide is used:

Equation I—

$$4ACO_3 + B'_2O_5 + B''_2O_3 \rightarrow 4AB'_{0.5}B''_{0.5}O_3 + 4CO_2$$

Equation II—

$$4AO + B'_2O_5 + B''_2O_3 \rightarrow 4AB'_{0.5}B''_{0.5}O_3$$

A, B', and B'' represent the elements as heretofore disclosed, and C and O represent carbon and oxygen, respectively. For example, when A is strontium, B' is niobium, and B'' is gallium, the reaction proceeds according to Equation III when $SrCO_3$ is used, and according to Equation IV with SrO as a reactant:

Equation III—

$$4SrCO_3 + Nb_2O_5 + Ga_2O_3 \rightarrow 4SrNb_{0.5}Ga_{0.5}O_3 + 4CO_2$$

Equation IV—

$$4SrO + Nb_2O_5 + Ga_2O_3 \rightarrow 4SrNb_{0.5}Ga_{0.5}O_3$$

For a clearer understanding of the invention, the following specific examples are given. These examples are intended to be merely illustrative of the invention and not in limitation thereof. Unless otherwise specified, all parts are by weight.

EXAMPLE I

A mixture was prepared comprising 10.00 g. of $SrCO_3$ and 3.174 g $Ga_2O_3$ and 4.501 g. $Nb_2O_5$ which are stoichiometric quantities of reactants for the equation:

$$4SrCO_3 + Nb_2O_5 + Ga_2O_3 \rightarrow 4SrNb_{0.5}Ga_{0.5}O_3 + 4CO_2$$

The mixture was ground in an agate ball mill under acetone for 1 to 2 hours, filtered and dried. The mixture was fired for about 2 hours at a temperature of 1200° C. The cooled product of this heating was weighed to check that the theoretical amount of $CO_2$ had been eliminated. The fired powder was remixed, this time dry, and was pressed into a pellet 1″ in diameter using a pressure of 20,000 p.s.i. This pellet was then refired at 1400° C. for 1 hour in vacuo. The ceramic polycrystalline pellet resulting was of about 80% theoretical density.

The product was a white crystalline material. Chemical analysis showed the material to contain 20.78% Nb. The calculated Nb content for $SrGa_{0.5}Nb_{0.5}O_3$ is 21.41%. X-ray diffraction analysis showed the crystalline material to be of cubic structure having lattice parameter $a_0 = 3.9477$ A. The electrical properties are listed with data for other samples in the table of Example II.

EXAMPLE II

Using the same general procedure as given in Example I, the compounds listed in the following table were prepared and tested by the procedures described below.

The parameters of all cubic compounds were determined on the basis of powder diffraction patterns obtained in a 114.6 mm. Philips camera at 24.5° C. All films were corrected for film shrinkage and the parameters given can be considered as accurate to ±0.0005 A. The parameters in crystals having a distorted cubic structure were obtained by use of a diffractometer.

The densities of the new compositions were determined by X-ray diffraction methods and by means of pycnometric measurements. The densities were determined on powdered specimens of −200 mesh. For the pycnometric measurements, the samples were weighed into a 5 ml. pycnometer and $CCl_4$ was distilled onto the sample under vacuum.

Resistivities were determined with an impedance bridge, and the dielectric constants were determined from capacitance measurements in disc-shaped samples of known dimensions at a frequency of one kilocycle, using the relationship $$C = \frac{(K_e \cdot \epsilon_0) \text{ area}}{d}$$

where $C$ = capacitance
$K_e$ = dielectric constant
$\epsilon_0$ = permittivity of free space, which is $8.85 \times 10^{-12}$ farads/meter
$d$ = thickness of sample Any errors due to inaccuracies in measurement of the radius and thickness of sample are within the limits of experimental error in this art.

I claim:
1. A process for producing a compound of the following formula

$$AB'_{0.5}B''_{0.5}O_3$$

wherein A is selected from the group consisting of barium and strontium; B' is niobium; B'' is selected from the group consisting of chromium, indium, gallium, lanthanum, and praseodymium; and O is oxygen, comprising firing a powdered mixture of (1) an alkaline earth metal compound selected from the group consisting of barium oxide, barium carbonate, strontium oxide, and strontium carbonate; (2) niobium pentoxide; and (3) a metal oxide selected from the group consisting of chromium sesquioxide, indium sesquioxide, gallium sesquioxide, lanthanum sesquioxide, and praseodymium sesquioxide, the proportions in said powdered mixture being 4 mols of the alkaline earth metal compound, 1 mol of niobium pentoxide, and 1 mol of the metal sesquioxide.

2. A compound having the formula $$AB'_{0.5}B''_{0.5}O_3$$

wherein A is selected from the group consisting of barium and strontium; B' is niobium; B'' is selected from the group consisting of chromium, indium, gallium, lanthanum and praseodymium; and O is oxygen.

3. As a new composition of matter, a compound of chemical formula $SrNb_{0.5}Cr_{0.5}O_3$ having a dielectric constant of about 27.

4. As a new composition of matter, a compound of chemical formula $BaNb_{0.5}La_{0.5}O_3$ having a dielectric constant of about 74.

Table

| Composition | Chemical Analysis,[1] Wt. percent | Color | Crystal Structure | Lattice Parameters, A. Units | | | Density Measurements, g. cc.$^{-1}$ | | Dielectric Constant | Resistivity, ohm. cm. |
|---|---|---|---|---|---|---|---|---|---|---|
| | | | | $a_0$ | $c_0$ | $c/a$ | X-Ray | Pycnometric | | |
| $SrNb_{0.5}Cr_{0.5}O_3$ | Sr ―――― Cr 11.98 (12.50) Nb 21.73 (22.32) | light brown. | cubic | 3.9421 | | | 5.64 | 5.70 | 27.73 | $8.00 \cdot 10^5$ |
| $SrNb_{0.5}Ga_{0.5}O_3$ | Sr ―――― Ga ―――― Nb 20.78 (21.41) | white | do | 3.9477 | | | 5.85 | 5.79 | 13.7 | $>10^9$ |
| $SrNb_{0.5}In_{0.5}O_3$ | Ba ―――― In ―――― Nb 16.12 (16.06) | do | do | 4.1454 | | | 6.74 | 6.73 | 13.9 | $>10^9$ |
| $SrNb_{0.5}In_{0.5}O_3$ | Sr ―――― In ―――― Nb 18.97 (19.40) | do | do | 4.0569 | | | 5.95 | 5.85 | 10.3 | $>10^9$ |
| $BaNb_{0.5}La_{0.5}O_3$ | Ba: 44.86% (45.59) Nb: 15.93% (15.42) | do | Distorted cubic. | 4.298 | 4.337 | 1.009 | 6.24 | 6.07 | 74.4 | $2.3 \cdot 10^5$ |
| $BaNb_{0.5}Pr_{0.5}O_3$ | Ba: 45.43% (45.44) Nb: 15.94% (15.37) | yellow | cubic | 4.285 | | | 6.38 | 6.30 | 67 | $1.5 \cdot 10^7$ |

[1] The number in parentheses in each case is the theoretical value for the compound.

The data given in the above table are considered to establish that the products of this invention are new compositions of matter of the above formulae. Moreover, this table is significant from the standpoint of the electrical data set forth therein, particularly the high dielectric constants which render the materials useful in the manufacture of capacitors.

Since it is obvious that many changes and modifications can be made in the above-described details without departing from the nature and spirit of the invention it is to be understood that the invention is not to be limited to said details except as set forth in the appended claims.

5. As a new composition of matter, a compound of chemical formula $BaNb_{0.5}Pr_{0.5}O_3$ having a dielectric constant of about 67.

6. As a new composition of matter, a compound of chemical formula $BaNb_{0.5}In_{0.5}O_3$ having a dielectric constant of about 13.

7. As a new composition of matter, a compound of chemical formula $SrNb_{0.5}Ga_{0.5}O_3$ having a dielectric constant of about 13.

References Cited in the file of this patent

UNITED STATES PATENTS 2,992,929    Clement et al. ――――――― July 18, 1961